United States Patent
Hartney et al.

(10) Patent No.: US 10,088,053 B1
(45) Date of Patent: Oct. 2, 2018

(54) TANDEM SEAL FOR A CONVEYOR ROLLER

(71) Applicant: RULMECA CANADA LIMITED, Wallaceburg (CA)

(72) Inventors: Joseph Hartney, Wallaceburg (CA); Christopher Duchene, Tupperville (CA)

(73) Assignee: RULMECA CANADA LIMITED, Wallaceburg, Ontario (CA)

( * ) Notice: Subject to any disclaimer, the term of this patent is extended or adjusted under 35 U.S.C. 154(b) by 0 days.

(21) Appl. No.: 15/614,689

(22) Filed: Jun. 6, 2017

(51) Int. Cl.
| | |
|---|---|
| *B65G 39/00* | (2006.01) |
| *B65G 39/02* | (2006.01) |
| *F16J 15/447* | (2006.01) |
| *B65G 39/09* | (2006.01) |
| *F16C 33/78* | (2006.01) |
| *F16C 33/80* | (2006.01) |

(52) U.S. Cl.
CPC .......... *F16J 15/4476* (2013.01); *B65G 39/09* (2013.01); *F16C 33/7816* (2013.01); *F16C 33/80* (2013.01); *F16C 2326/58* (2013.01)

(58) Field of Classification Search
None
See application file for complete search history.

(56) References Cited

U.S. PATENT DOCUMENTS

| | | | | |
|---|---|---|---|---|
| 4,793,459 A | * | 12/1988 | Forknall | B65G 39/09 193/37 |
| 5,937,996 A | * | 8/1999 | Friedman | B65G 65/46 198/533 |
| 6,234,293 B1 | | 5/2001 | Fasoli | |
| 8,146,733 B2 | | 4/2012 | Fox | |

FOREIGN PATENT DOCUMENTS

DE      24 21 379 A1      11/1975

\* cited by examiner

*Primary Examiner* — Kavel Singh

(57) ABSTRACT

A tandem seal, according to the present invention, is provided for a conveyor roller having a drum body with opposing ends rotatably mounted on an axle by way of a bearing assembly within a flanged housing attached at either end of the drum body. The tandem seal has an end cap rigidly mounted within the flanged housing, extending radially inwardly towards the axle and spaced apart therefrom. A guard is rigidly mounted on the axle and extends radially outwardly from the axle and is spaced apart from the end cap. A first contact seal seals the space between the guard and the end cap and a second contact seal seals the space between the axle and the flanged housing.

5 Claims, 6 Drawing Sheets

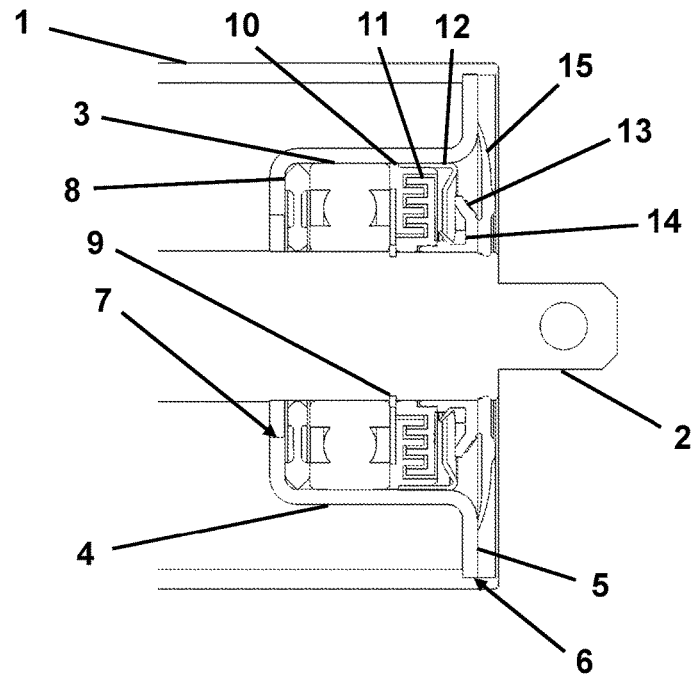
FIG. 4
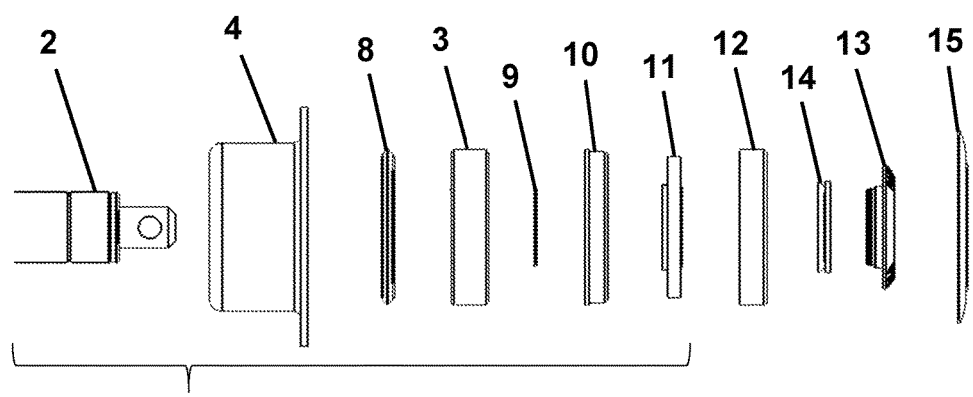
Prior Art  FIG. 5

TANDEM SEAL FOR A CONVEYOR ROLLER

FIELD OF THE INVENTION

The present invention relates to conveyor rollers and, in particular, to seals for conveyor rollers.

BACKGROUND

Conveyor belts are widely used in a diverse set of industrial and commercial applications. Many industrial operations, such as mining or other resource extraction operations rely on conveyor belts to move large quantities of heavy material between processing steps in the operation.

Many of these operations produce low-cost resources and depend on large high-speed, high-volume conveyor belt systems to provide the necessary throughput to make the operation profitable. In such operations, machine maintenance, including maintenance of the conveyor belt, and the resulting downtime, is carefully planned and scheduled to maximize productivity and, thus, profitability of the operation.

Contamination of the roller mechanism by dust and debris from the surrounding operation is a significant problem for conveyor rollers and can cause failure of the roller and result in costly unscheduled downtime. When a roller requires unscheduled maintenance, the entire conveyor belt system, and other all associated processes, must be shut down to access and replace the roller. The financial cost to an operation, associated with a process-wide shutdown, can be unacceptably high.

Accordingly, there is a need for seals that minimize contamination of the roller mechanism with dust and debris, during conveyor operations, to prevent or reduce unscheduled downtime of conveyor belts, due to roller failure caused by contamination of the roller mechanism.

SUMMARY OF THE INVENTION

A tandem seal, according to the present invention, is provided for a conveyor roller having a drum body with opposing ends rotatably mounted on an axle by way of a bearing assembly within a flanged housing attached at either end of the drum body. The tandem seal has an end cap rigidly mounted within the flanged housing, extending radially inwardly towards the axle and spaced apart therefrom. A guard is rigidly mounted on the axle and extends radially outwardly from the axle and is spaced apart from the end cap. A first contact seal seals the space between the guard and the end cap and a second contact seal seals the space between the axle and the flanged housing.

BRIEF DESCRIPTION OF THE DRAWINGS

In order that the invention may be more clearly understood, a preferred embodiment thereof will now be described in detail by way of example, with reference to the accompanying drawings, in which:

FIG. 4 is a side sectional view of the tandem seal on one end of an idler roller.

FIG. 5 is an exploded side view of the tandem seal, along with the other components at each end of an idler roller.

DESCRIPTION OF THE PREFERRED EMBODIMENT

A tandem seal for a conveyor roller, according to the present invention, is installed as part of the sealing structure at each end of a conveyor roller to prevent ingress of contaminants, such as dust or debris into the roller mechanism. The invention will be hereafter described with reference to an idler roller, but may be used to seal other types of rollers. Further, the tandem seal may be used with a conveyor roller not including one or more of the components described below, not forming part of the tandem seal, so long as the conveyor roller has a drum body rotatably mounted on an axle.

Figure 1:
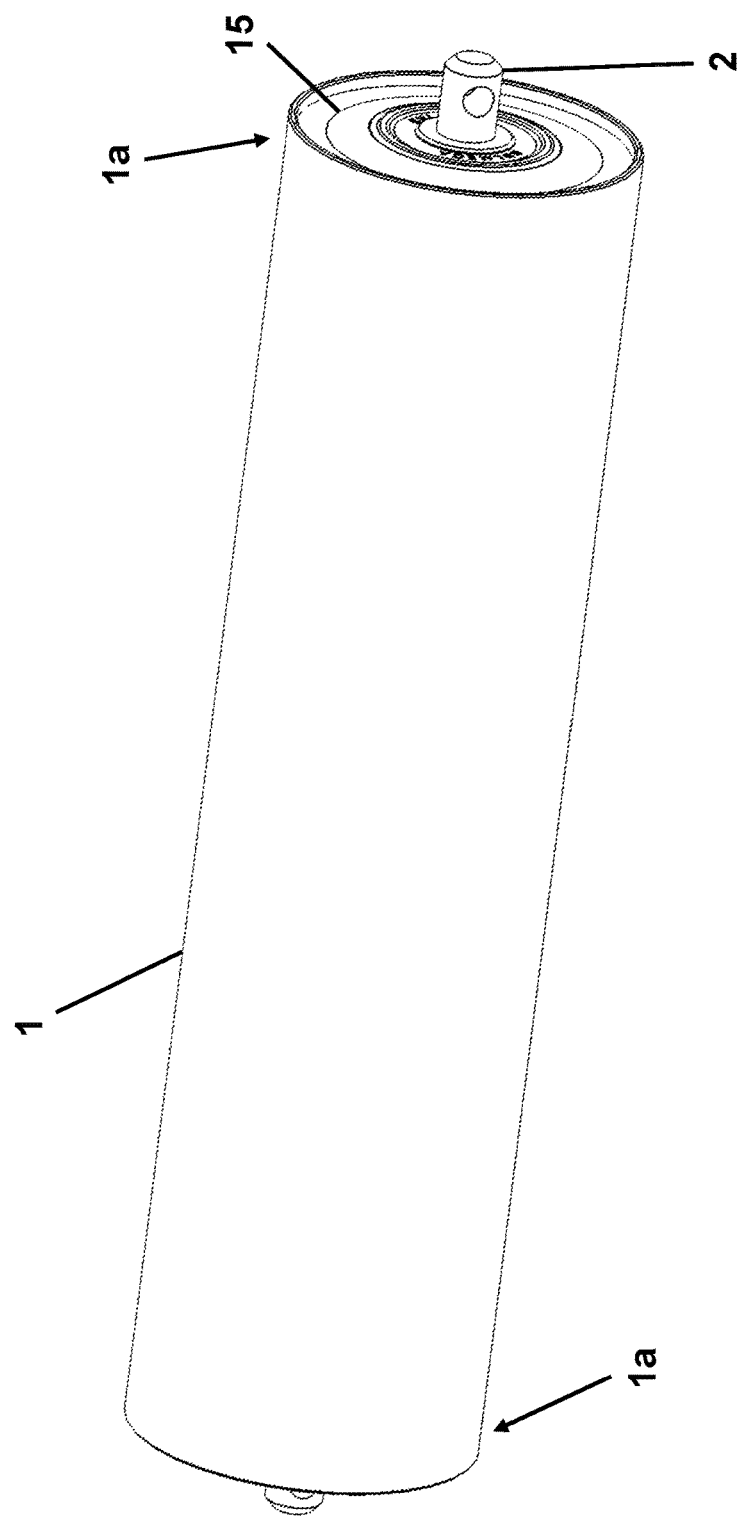
FIG. 1 is an isometric view of an idler roller including the tandem seal, according to the present invention.
Figure 2:
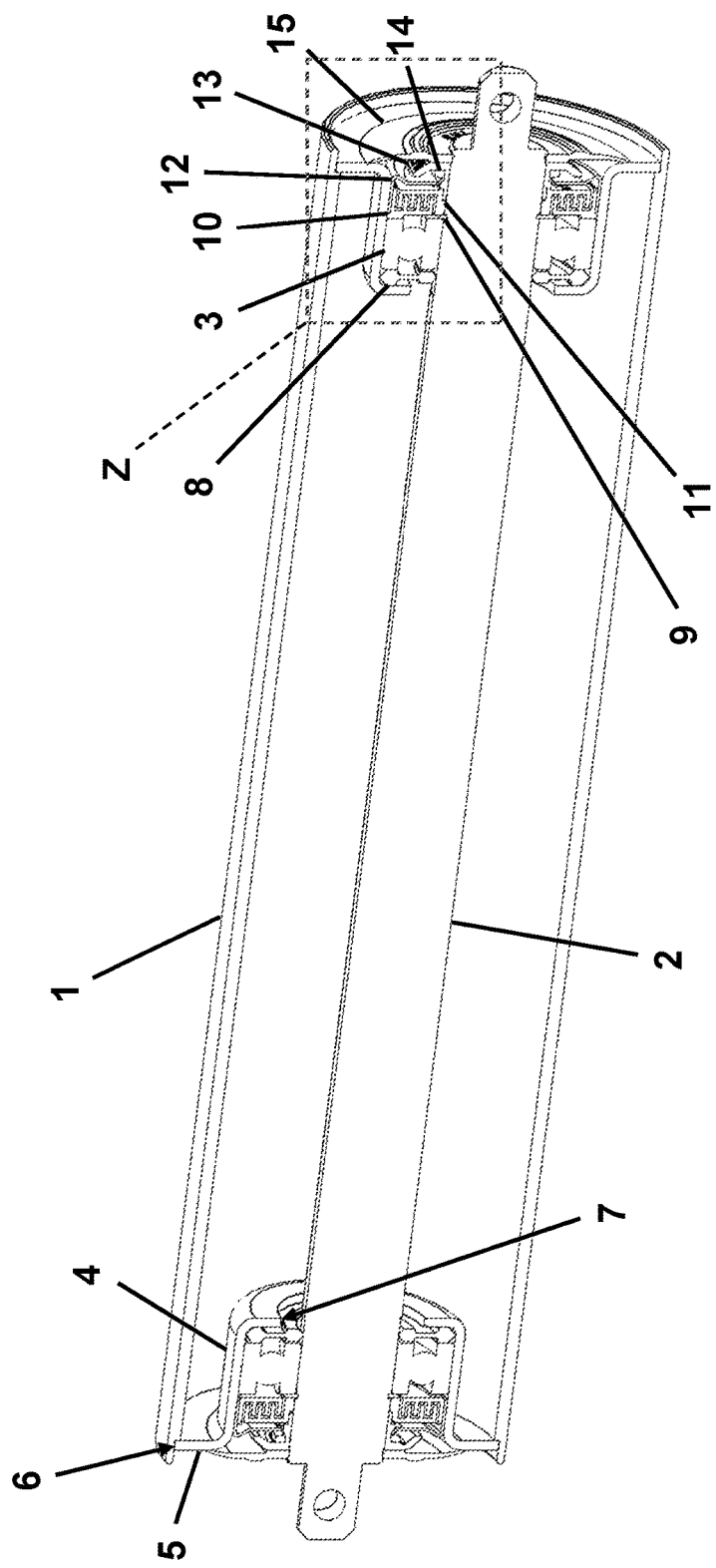
FIG. 2 is a sectional view of the idler roller, shown in FIG. 1.

As shown in FIGS. 1 and 2, an idler roller has a hollow cylindrical drum body 1, which is rotatably mounted on an axle 2 by way of a bearing assembly 3, located adjacent each end 1a of the drum body 1. The drum body 1 has a length that is preferably shorter than the length of the axle 1 to permit installation of the idler roller with the axle 2 attached to opposing supports, such as in a conveyor (not shown).

Figure 3:
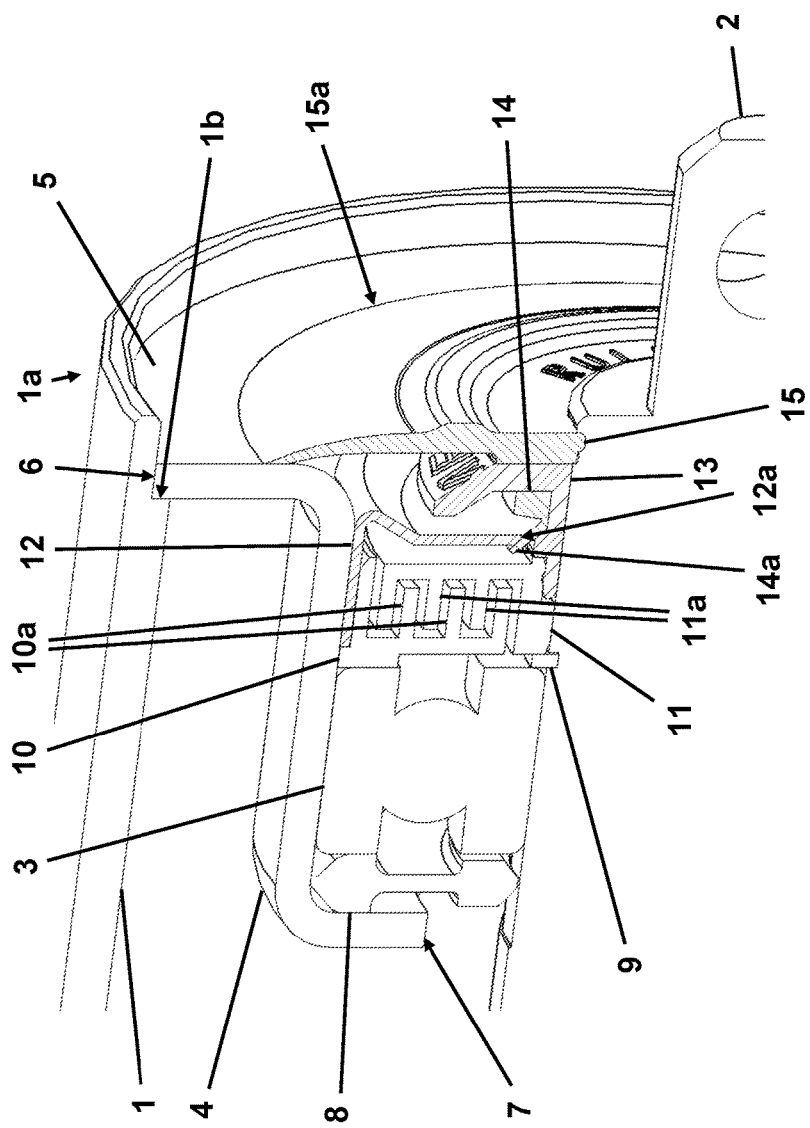
FIG. 3 is a closeup sectional view of the area at the end of the idler roller marked Z in FIG. 2, with the tandem seal shown with hash lines.

As shown in FIGS. 2-4, the bearing assembly 3 adjacent each end 1a of the drum body 1 is mounted within a flanged housing 4 extending radially inwardly from the drum body 1. The flanged housing 4 is shaped to define an end wall 5 of the drum body 1 and an annular space between the flanged housing 4 and the axle 2. Preferably, the flanged housing 4 has a generally Z-shaped cross section, with two 90° bends. The radially outward perimeter edge 6 of the flanged housing 4 is rigidly attached to the drum body 1. The radially inward perimeter edge 7 of the flanged housing 4 is spaced apart from the axle 2, so as not to come into contact therewith. As shown in FIGS. 3 and 4, a portion of the length of the drum body 1 at each end may have a reduced thickness to form a shoulder 1b on which the radially outward perimeter edge 6 of the flanged housing 4 is seated and attached.

Figure 6:
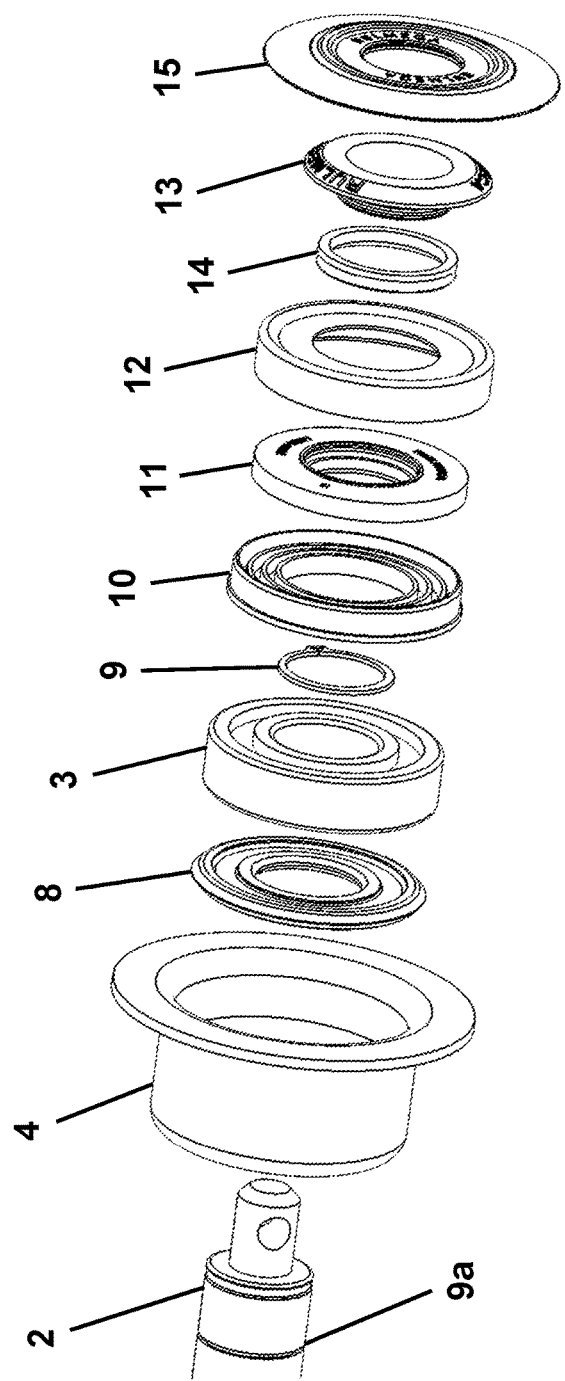
FIG. 6 is an isometric exploded view of the tandem seal, along with the other components at each end of an idler roller.
Figure 7:
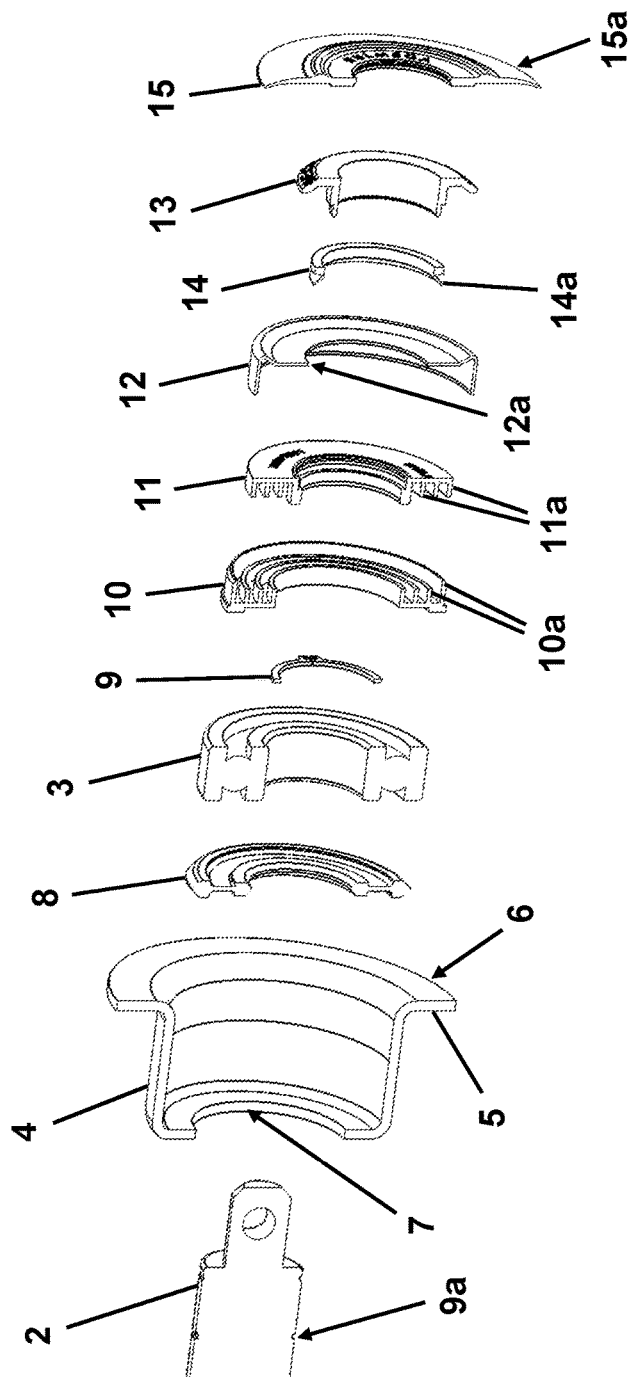
FIG. 7 is a sectional view of the tandem seal, along with the other components at each end of an idler roller, shown in FIG. 5.

The components within each flanged housing 4 at either end 1a of the drum body 1 are described hereafter, generally from the component furthest from the end 1a, in the axially inward direction, to the component closest to the end 1a. These components are shown in FIGS. 5-7 in exploded views from the furthest axially inward component at the left of the page, to the furthest axially outward component at the right of the page.

As shown in FIGS. 3-5, an inner seal 8 may be seated between the bearing assembly 3 and the flanged housing 4 axially inwardly from the end 1a of the drum body 1. Preferably, the inner seal 8 is a rubber O-shaped grease cap and prevents lubricant from the bearing assembly 3 from leaking into the drum body 1.

The bearing assembly 3 is mounted within the annular space between the axle 2 and the flanged housing 4. A radial ball bearing may be used, but other suitable bearing assemblies 3 may also be used. The inner ring of the radial ball bearing rotates with the axle 2, while the outer ring of the radial ball bearing rotates with the flanged housing 4 and the drum body 1. A plurality of ball bearings are positioned therebetween, within a cage to keep them in place, thereby permitting rotational motion of the drum body 1 relative to the axle 2. A ring clip 9 is seated within a complementary groove 9a on the axle 2 adjacent the bearing assembly 3 to keep it in place.

A labyrinth seal, with an outer labyrinth seal 10 and an inner labyrinth seal 11 is position adjacent the bearing assembly 3, axially outwardly toward the end 1a. The outer labyrinth seal 10 abuts the flanged housing 4 and is spaced apart from the axle 2. The inner labyrinth seal 11 abuts the axle 2 and is spaced apart from the flanged housing 4. Accordingly, the outer labyrinth seal 10 rotates with the drum body 1 relative to the inner labyrinth seal 11, while the inner labyrinth seal 11 remains stationary on the axle 2.

As shown in FIGS. 6 and 7, the outer labyrinth seal 10 is a flat ring-like structure extending radially inwardly towards the axle 2. A plurality of concentric circular walls 10a extend axially outwardly therefrom and define a plurality of grooves therebetween. The inner labyrinth seal 11 has a complementary structure, with a plurality of concentric circular walls 11a that extend axially inwardly therefrom configured to fit interlockingly with the walls 10a of the outer labyrinth seal 10, as shown in FIGS. 2-4. The outer and inner labyrinth seals 10 and 11 do not form a contact seal with one another, but rather provide a convoluted path through which any debris or contaminants must travel before reaching the bearing assembly 3.

Hereafter, the tandem seal will be described with reference to the example of the idler roller herein described. Although the tandem seal is described as interacting with various components of the idler roller, it may be adapted for use with other conveyor rollers that do not include these components.

As shown in FIGS. 3-7, an end cap 12 having a generally L-shaped cross-section is fitted between the outer labyrinth seal 10 and the flanged housing 4 and extends radially inwardly toward the axle 2. A small space is provided between the radially inward edge 12a of the end cap 12 and the axle 2. Alternatively, the radially inward edge 12a may be spaced apart from another component mounted on the axle 2, such as the guard 13, as described below. The end cap 12 is rigidly mounted within the flanged housing 4 and therefore rotates relative to the axle 2 with the drum body 1.

As shown in FIGS. 3 and 4, a guard 13 is fitted between the axle 2 and the inner labyrinth seal 11 and extends radially outwardly from the axle 2 and is spaced apart from the end cap 12 and the flanged housing 4. The guard 13 may also curve axially inwardly towards the end cap 12, without coming into contact therewith, to define a space between the guard 13 and the end cap 12 for a first contact seal 14. The guard 13 is rigidly mounted on the axle 2 and therefore remains stationary relative to the axle 2 as the drum body 1 rotates thereabout.

As shown in FIGS. 2-4, the first contact seal 14 is seated on the guard 13 about the axle 2. The first contact seal 14 forms a contact seal between the guard 13 and the end cap 12. Preferably, the first contact seal 14 is a v-ring seal, which is seated on the guard 13 within the space between the guard 13 and the end cap 12. The first contact seal 14 has a lip 14a that engages with the radially inward edge 12a of the end cap 12 to form a contact seal therewith. The lip 14a is biased against the end cap 12 so as to remain in sealing engagement therewith, as the end cap 12 rotates relative to the axle 2. The first contact seal 14 is preferably made of rubber or other suitable material.

During operation, the first contact seal 14 is seated on the guard 13 and remains stationary relative to the axle 2, while the drum body 1, flanged housing 4, and end cap 12 rotate thereabout. The lip 14a extends radially outwardly from the guard 13 and rides on the radially inward edge 12a of the end cap 12 to form a contact seal and seal the space between the guard 13 and the end cap 12.

As shown in FIGS. 2-4, a second contact seal 15 is seated on the axle 2 axially outwardly adjacent to the guard 13. The second contact seal 15 forms a contact seal between the axle 2 and the end wall 5 of the flanged housing 4. Preferably, the second contact seal 15 is a gasket-type seal, or weather seal that fits closely about the axle 2 and extends radially outwardly therefrom to engage sealingly with the end wall 5. The radially outward edge 15a of the second contact seal 15 is biased against the end wall 5 so as to remain in sealing engagement therewith as the end wall 5 rotates relative to the axle 2. The second contact seal 15 is preferably made of rubber or other suitable material.

The present invention has been described with reference to an exemplary embodiment, however, it will be understood by those skilled in the art that various changed may be made and equivalents may be substituted for elements thereof without departing from the scope of the invention as set out in the following claims. Therefore, it is intended that the invention not be limited to the particular embodiments disclosed herein, but that the invention will include all embodiments falling within the scope of the following claims.

What is claimed is:

1. A tandem seal for a conveyor roller, having a drum body with opposing ends, an axle, a bearing assembly, and a flanged housing attached at either end of the drum body and spaced apart from the axle, wherein the flanged housing is shaped to define an end wall and an annular space between the flanged housing and the axle, and wherein the drum body is rotatably mounted on the axle by way of the bearing assembly within the annular space defined by the flanged housing, the tandem seal comprising:
   an end cap rigidly mounted to the flanged housing axially outwardly from the bearing assembly within the annular space extending radially inwardly from the flanged housing towards the axle and spaced apart from the axle;
   a guard rigidly mounted on the axle axially outwardly from the bearing assembly extending radially outwardly from the axle and spaced apart from the end cap;
   a first contact seal positioned axially outwardly from the bearing assembly sealing the space between the guard and the end cap; and
   a second contact seal positioned axially outwardly from the first contact seal sealing the space between the axle and the end wall of the flanged housing.

2. The tandem seal, according to claim 1, wherein the first and second contact seals remain rotationally stationary relative to the axle as the drum body rotates thereon.

3. The tandem seal, according to claim 2, wherein the first seal is a v-ring seal seated on the guard having a lip that extends radially outwardly and is biased against the end cap to form a contact seal therewith.

4. The tandem seal, according to claim 3, wherein the second contact seal is a gasket-type seal seated on the axle that extends radially outwardly and is biased against the end wall of the flanged housing to form a contact seal therewith.

5. The tandem seal, according to claim 4, wherein the second contact seal is located axially adjacent to and abutting the guard.

* * * * *